United States Patent
Kerley et al.

(10) Patent No.: US 10,395,309 B2
(45) Date of Patent: Aug. 27, 2019

(54) DETECTION OF ACTIVITY PATTERNS

(75) Inventors: Paul Kerley, County Dublin (IE); Kevin Mary O'Leary, Dublin (IE); Kilian Colleran, Dublin (IE); Cecil Hayes, County Dublin (IE); Liam Griffin, County Meath (IE)

(73) Assignee: DETICA PATENT LIMITED, Dublin (IE)

( * ) Notice: Subject to any disclaimer, the term of this patent is extended or adjusted under 35 U.S.C. 154(b) by 415 days.

(21) Appl. No.: 12/450,528

(22) PCT Filed: Mar. 27, 2008

(86) PCT No.: PCT/IE2008/000030
§ 371 (c)(1),
(2), (4) Date: Sep. 29, 2009

(87) PCT Pub. No.: WO2008/120180
PCT Pub. Date: Oct. 9, 2008

(65) Prior Publication Data
US 2010/0100693 A1   Apr. 22, 2010

Related U.S. Application Data

(60) Provisional application No. 60/920,825, filed on Mar. 30, 2007.

(51) Int. Cl.
*G06Q 40/00* (2012.01)
*G06Q 10/10* (2012.01)

(52) U.S. Cl.
CPC ............ *G06Q 40/00* (2013.01); *G06Q 10/10* (2013.01)

(58) Field of Classification Search
USPC .................................................. 707/999.006
See application file for complete search history.

(56) References Cited

U.S. PATENT DOCUMENTS 5,140,685 A * 8/1992 Sipple et al. ................. 711/164
5,819,226 A   10/1998 Gopinathan et al.
(Continued)

FOREIGN PATENT DOCUMENTS

GB          2 357 603        6/2001
WO    WO 2006/085293        8/2006

OTHER PUBLICATIONS

International Search Report dated Jun. 11, 2008.

*Primary Examiner* — Muluemebet Gurmu
(74) *Attorney, Agent, or Firm* — Scully, Scott, Murphy & Presser, P.C.

(57) ABSTRACT

A monitoring system (1) comprises an interface (2) for receiving source alerts from at least one detection engine, a database (7) of historical events; and a classifier (3) for classifying received source alerts by linking a source alert with an historical event or a current source alert to provide a link, and providing said link as an output alert. The classifier comprises match methods (9) for processing source alerts and generating a score for extent of matching of a source alert with an historical event or current source alert, a voting engine (4) for weighting scores from the match methods (9), and a linking function (6) for determining that there is a link if a combination of the weighted outputs of a plurality of match methods exceeds a threshold. At least some match methods (9) are each associated with a specific field of a source alert such as a numerical value field or a name field of a source alert. A feedback function (6) notifies a case management system (5) of links, and the voting engine (4) receives from the case management system (5) feedback (11) of success of each match method (9), and adjusts match method weights (12) accordingly.

18 Claims, 3 Drawing Sheets

(56) References Cited

U.S. PATENT DOCUMENTS

| | | | |
|---|---|---|---|
| 5,907,602 A * | 5/1999 | Peel et al. | 379/114.14 |
| 5,943,670 A * | 8/1999 | Prager | |
| 5,978,940 A * | 11/1999 | Newman et al. | 714/712 |
| 6,965,886 B2 | 11/2005 | Govrin et al. | |
| 2002/0078381 A1* | 6/2002 | Farley et al. | 713/201 |
| 2003/0093580 A1* | 5/2003 | Thomas et al. | 709/318 |
| 2003/0187706 A1* | 10/2003 | Buchmiller et al. | 705/7 |
| 2004/0177053 A1* | 9/2004 | Donoho et al. | 706/47 |
| 2004/0213437 A1* | 10/2004 | Howard et al. | 382/115 |
| 2005/0267807 A1* | 12/2005 | Bentley, III | 705/14 |
| 2006/0068755 A1* | 3/2006 | Shraim et al. | 455/410 |
| 2006/0092861 A1* | 5/2006 | Corday et al. | 370/256 |
| 2006/0149674 A1* | 7/2006 | Cook | G06Q 20/40 705/44 |
| 2007/0255702 A1* | 11/2007 | Orme | 707/5 |
| 2008/0028069 A1* | 1/2008 | Urbanek et al. | 709/224 |
| 2008/0103799 A1* | 5/2008 | Domenikos et al. | 705/1 |
| 2008/0177839 A1* | 7/2008 | Chang et al. | 709/205 |
| 2009/0271349 A1* | 10/2009 | Allen et al. | 706/47 |
| 2010/0100693 A1* | 4/2010 | Kerley et al. | 711/154 |

\* cited by examiner

DETECTION OF ACTIVITY PATTERNS

This is a national stage of PCT/IE08/000030 filed Mar. 27, 2008 and published in English, claiming benefit of U.S. provisional application No. 60/920,825, filed Mar. 30, 2007, hereby incorporated by reference.

The invention relates to monitoring of activities such as financial transaction processing.

Financial service organisations are required to comply with a wide range of regulatory requirements related to financial stability, transparent auditing and control, and the detection of money laundering.

As many institutions have millions of customers and process large volumes of transactions daily, sometimes in the order of millions daily, analysis of the transactions can be onerous.

In addition to compliance requirements, financial services providers are challenged to deal with an increasing amount of fraud across a number of channels. Examples include debit card fraud involving stolen or duplicated cards used to make purchases or obtain cash; mortgage application fraud to obtain a loan under false pretences; insurance claims fraud involving a claim for a loss that did not occur, or for which the loss has been exaggerated; and internal fraud where an employee or other insider defrauds the organisation. While the proportion of individuals involved in these activities is small, all transactional and customer activity must be monitored to identify suspect events and minimise losses due to fraud.

Automated monitoring systems typically have a data acquisition component to extract the transaction from a source system, transform it into the required format and load it into the application. In this context, a transaction is taken to mean not only a financial transaction, but also the exchange of a unit of information that could be relevant to a financial crime including the addition of a new customer or the opening/closing of an account. Business rules may be applied by a rules engine to each transaction. For example, a typical money-laundering rule is to identify all transactions above a certain threshold. Statistical or analytical techniques may also be employed to make a decision about the nature of a transaction. For example, the transaction could be compared to a historical average to determine if it is a statistically significant deviation from the norm. If an unusual or suspicious event occurs, the rule engine or analysis engine sends an alert message to an external system.

GB 2357603B2 describes an approach to detection based on statistical comparison of the properties of a transaction with an historical baseline. When an unusual transaction occurs, an alert is sent to the system operator for investigation.

U.S. Pat. No. 5,819,226 describes the use of a neural network, which is used to determine if an alert should be generated based on an input pattern of transactions matching the characteristics of a previous pattern of interest.

WO2006/085293A1 describes a real-time rules-based method for transaction monitoring.

U.S. Pat. No. 6,965,886 describes a real-time analytic engine which distributes an alert message for each suspicious event.

Once a detection engine has generated an alert, it is incumbent on the user to investigate the reason for the alert, and to that end institutions have dedicated teams of investigators to investigate each alert. Parts of the investigation process may be automated within a case management system which manages an investigation through a number of phases. Typically, this process starts by determining if the alert is truly genuine or a false alarm. If the investigator believes the alert is genuine, the alert is processed through a well-defined sequence of steps within a business process or workflow. This may involve the creation of a case. A case could include for example details of the alert, the entity to which it relates (customer, account, insurance claim etc), which transactions contributed to the alert, together with any supporting documentation or notes appropriate to the investigation. The end stage of the workflow could include filing a report with the government regulator, taking steps to counteract fraud (for example by cancelling a credit card) or simply closing the case and leaving it on file for future reference.

During the preparation of the case, a significant amount of time may be spent searching for and associating alerts from multiple detection engines involving similar individuals, places, accounts etc. In addition, as new alerts occur, they may prove to be linked to a previous case. As alert message volumes are very large, typically greater than 10 million/year for some organisations, the current approach of manual analysis and linking of alerts is very inefficient. It appears that because exact matching is not possible in many circumstances satisfactory automated systems have not been developed.

The invention addresses this problem.

SUMMARY OF THE INVENTION

According to the invention, there is provided a monitoring system comprising:
an interface for receiving source alerts from at least one detection engine,
a database of historical events;
a classifier for classifying received source alerts by linking a source alert with an historical event or a current source alert to provide a link, and providing said link as an output alert, wherein the classifier comprises:
a plurality of match methods for processing source alerts and generating a score for extent of matching of a source alert with an historical event or current source alert,
a voting engine for weighting scores from the match methods,
a linking function for determining that there is a link if a combination of the weighted outputs of a plurality of match methods exceeds a threshold.

In one embodiment, at least some match methods are each associated with a specific field of a source alert.

In one embodiment, a match method processes a numerical value field of a source alert.

In one embodiment, a match method processes a name field of a source alert.

In one embodiment, a match method processes risk quantifiers in source alerts.

In one embodiment, the voting engine is adapted to apply linear or non-linear functions to determine weights.

In one embodiment, the system comprises a feedback function for notifying a case management system of links, the voting engine comprises a function for receiving from the case management system feedback of success of each match method, and for adjusting match method weights accordingly.

In one embodiment, the voting engine initializes a plurality of match method weights to be equal but varies them according to success of the individual match methods in identifying links.

In one embodiment, said feedback includes a number of false positives and a number of false negatives.

In one embodiment, the voting engine comprises means for locking score registers so that they can not be simultaneously accessed by more than one user, thus preserving the integrity of the data in the register In one embodiment, the system further comprises a timer to periodically trigger a process to query the historical event database to extract a set of records which are passed through the classifier, scored by the voting engine and linked together before being passed to the case management system.

In one embodiment, the timer is adapted to inspect the database and extract a set of grouped events according to search criteria, and the classifier is adapted to compare a source alert with other members of the group using a set of match methods.

In one embodiment, the linking function is adapted to insert a new database record comprising a unique key of the group, and a unique key for each linked alert, and a flag to indicate that the alerts are linked.

In one embodiment, the interface comprises an adapter for normalizing the source alerts.

In one embodiment, the adapter performs source alert validation.

In one embodiment, the adapter adds data to a source alert.

In one embodiment, the adapter dynamically retrieves data from a database to add to a source alert.

In one embodiment, the system comprises means for routing a source alert directly to the classifier, by-passing the adapter.

In one embodiment, the system is adapted to instantiate adapter objects including memory buffers to temporarily hold messages until they can be processed.

In one embodiment, each adapter object fetches messages from a memory buffer and executes a set of logical routines on individual fields of each source alert to perform validation of fields of the source alert to check that they meet quality tests.

In one embodiment, said routines perform transformation of individual source alert fields into a required format or create additional fields which are combinations of existing fields.

In one embodiment, the system further comprises a configuration function for configuring at least one of the components of the system, including the classifier.

In one embodiment, the system further comprises a case management system for transmitting feedback to the classifier.

In another aspect, the invention provides a computer readable medium comprising software code for performing operations of a monitoring system defined above when executing on a digital processor.

DETAILED DESCRIPTION OF THE INVENTION

The invention will be more clearly understood from the following description of some embodiments thereof, given by way of example only with reference to the accompanying drawings in which:—

DESCRIPTION OF THE EMBODIMENTS

Figure 1:
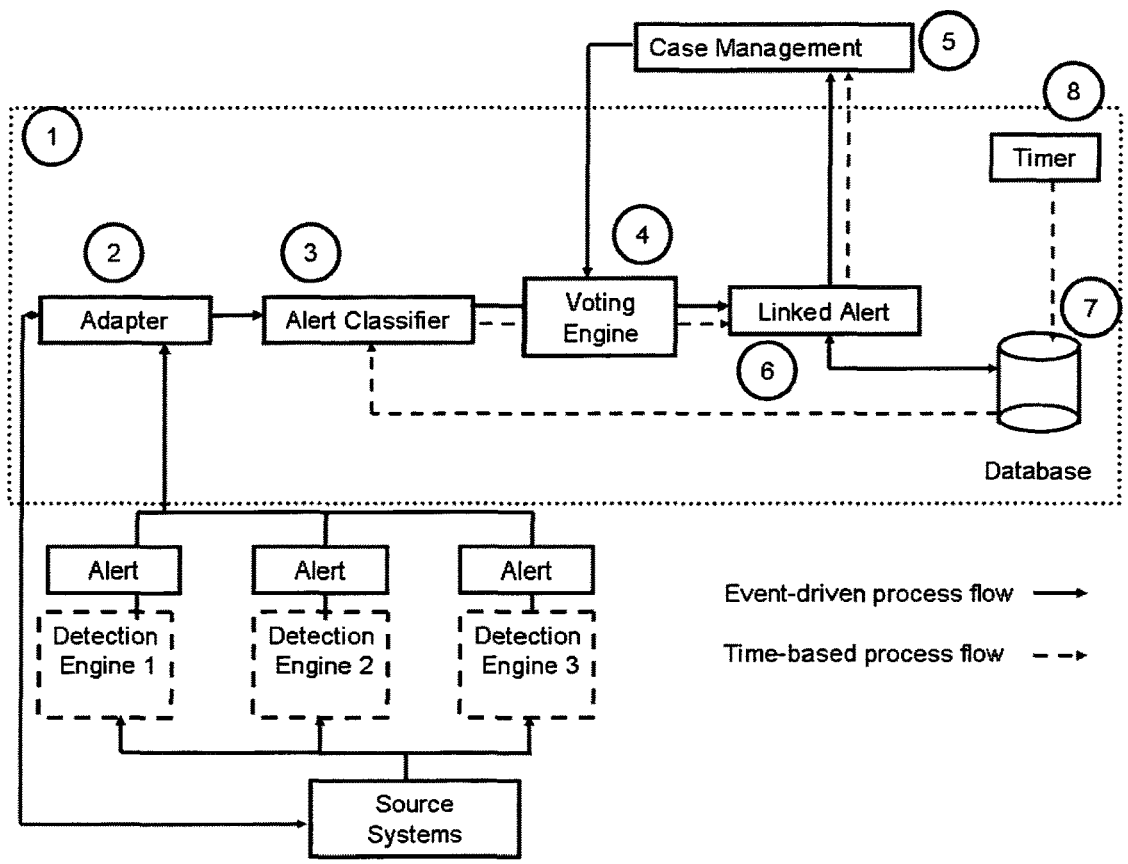
FIG. 1 is a schematic illustration of a monitoring system of the invention.

Referring firstly to FIG. 1, a financial institution has a set of data in its source systems, including for example, customer, account, transaction, policy, or employee information. This information is presented to one or more detection engines whose purpose is to analyse the data and raise an alert under defined circumstances. Such an engine may for example be that described in U.S. Pat. No. 6,965,886. The detection engines may be devoted to specific business areas, such as anti-money laundering or card fraud, or the same detection engine may service more than one business area. Each detection engine is capable of generating an alert which is relayed externally. The alert can be in a variety of forms, for example an e-mail, a new database record, an entry on a message queue, or a text message.

A monitoring system 1 of the invention processes the alerts received from the external detection systems. It comprises an adapter 2 which receives the alerts. It in turn feeds an alert classifier 3, which in turn feeds a voting engine 4. The output of the voting engine 4 feeds a linked alert function 6 which accesses a database 7. The linked alert function 6 feeds a case management system 5, which periodically updates the voting engine 4, thereby providing a feedback loop. A timer 8 periodically triggers a process to query the database 7 to extract a set of records which are passed through the classifier 3, weighted by the voting engine 4 and linked together before being passed to the case management system 5.

The output of the system 1 is an output alert comprising a linking of a source alert with another source alert or with an historical event. It is provided by the linked alert function 6. In one embodiment, the linked alert function inserts a new database record comprising the unique key of the source alert, the unique key(s) of one or more source alerts or other incidents and a flag to indicate that the alerts are linked.

The system 1 is in one embodiment implemented as a set of multiple instantiated objects which provide parallel processing capability.

Figure 2:
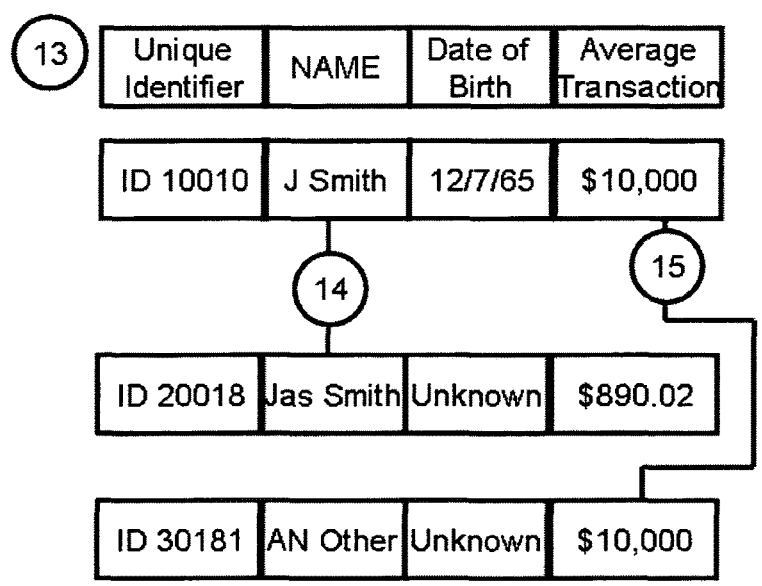
FIG. 2 is a schematic illustration of operation of adapters of the system.

Different detection engines may present alert information in different ways. Referring to FIG. 2, in one example a specific alert adapter 13 translates incoming alerts so that they contain four fields including a unique identifier, name, date of birth and average transaction size.

Figure 3:
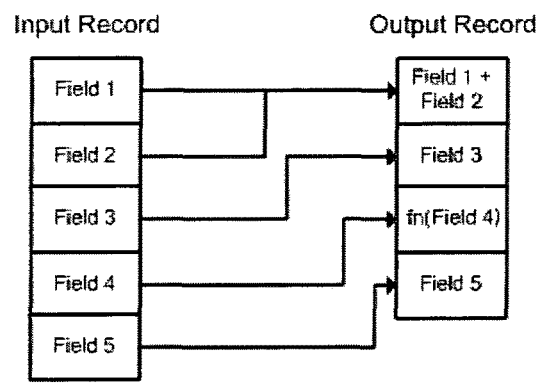
FIG. 3 is a schematic illustration of a particular adapter.

The system 1 instantiates adapter objects 2, which serve to standardise the form of the message. The adapter objects 2 include memory buffers to temporarily hold messages until they can be processed. Each adapter object 2 fetches messages from the memory buffer and executes a set of logical routines on the individual fields of each message. Referring to FIG. 3, the adapter objects 2 may perform validation of fields of the alert message to ensure that they meet specific data quality tests; transformation of individual fields into the required format or creation of additional fields which are combinations of existing fields.

The system 1 can also use unique identifiers in the alert to search for additional information in the source systems or elsewhere. The latter may for example involve using a unique customer key to retrieve the customer's address details from an external database. Search results are appended as sets of additional fields onto the alert message prior to the classification process. Extension of the alert message in this way facilitates a broader range of classification methods to be applied, increasing the accuracy of the classification process. The adapters 2 can also generate a unique key for the alert message where none exists.

In those cases where alert information requires no translation, an adapter object 2 is not required.

Figure 4:
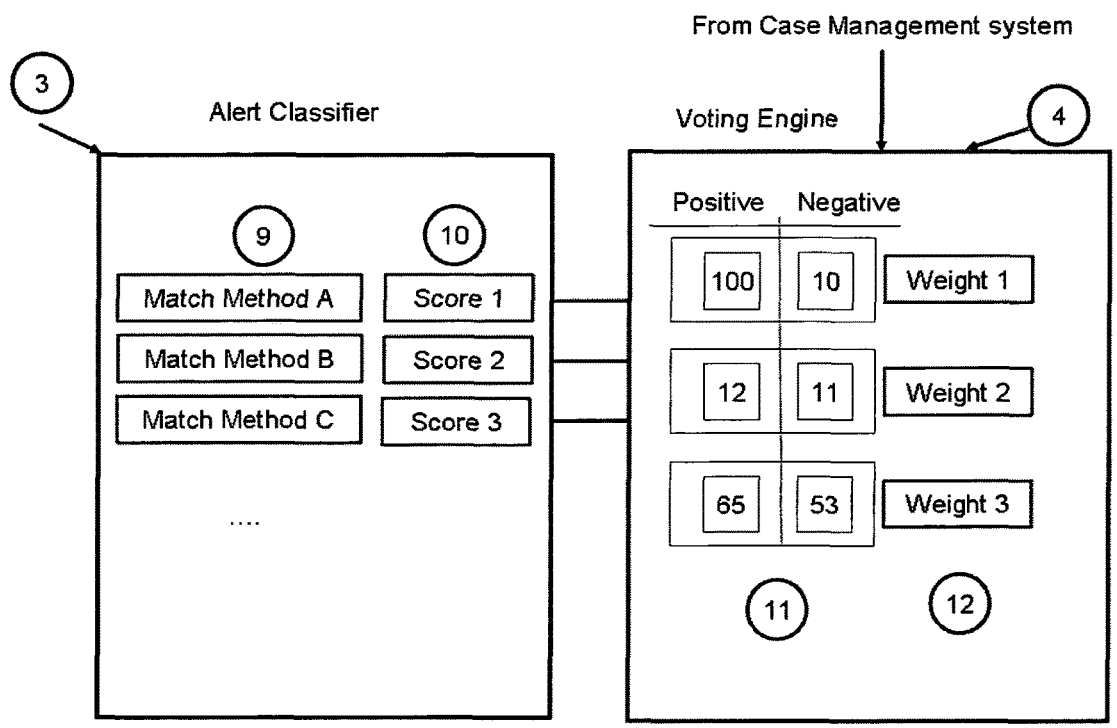
FIG. 4 is a schematic illustration of a classifier and voting engine of the monitoring system.

As shown in FIG. 4, the alert classifier 3 comprises N user-configurable match methods 9 and associated scorecards 9. Referring also to FIG. 2, it is desired to match the alert labelled with identifier ID10010 to related historical events using two matching methods. A matching method 13 retrieves events with similar names, as shown by an association 14; and a matching method B retrieves historical events with similar average transaction size, as shown by an association 15. Two matching incidents with unique identifiers ID20018 and ID30181 are retrieved, weighted by the voting engine, and passed to the case management system 5.

The alert classifier 3 parses each alert message and references the database 7 to link the source alert to a current source alert or historical event. The current source alerts are stored in memory so that links to them can be determined as well as links to historical events persisted in the database 7. The database 7 stores current and archived events including both previous output alerts and cases. The classifier 3 invokes at run-time a set of methods 9 to match user-defined fields of the source alert with user-defined fields of events in the database. Matching techniques include fuzzy text matching to find links based on descriptive attributes such as name, address, occupation, or quantitative matching such as measurement of Euclidean distance, Mahalanobis distance or similar distance metric applied to numeric attributes such as transaction size, transaction frequency or similar variables. In a financial institution, matching may also be based on risk, where risk can be a descriptive variable ("low risk", "high risk") or a quantitative variable such as loss exposure. For example, one matching method is to cross-check the name field of an alert triggered by an unusual transaction with the name fields of all other incidents in the database to determine if the same individual has been identified previously. Another matching method is to compare a numeric field recording transactional behaviour, such as the average transaction size, with the transaction fields of other incidents to find events with a similar transactional pattern.

An advantageous aspect of the system 1 is the management of false positives (alerts linked in error) and false negatives (alerts should have been linked but were not). Within the case management system 5, users can check the validity of the match as part of the investigation process, and also record where a match should have been made but was not. User feedback is captured in the voting engine 4, which records the number of positive votes (the linking engine 1 matched the alerts correctly) and negative votes (the linking engine 1 matched the alerts incorrectly, or the linking engine failed to make a match) associated with each classification method, based on the decisions made by the users of the case management system 5. The voting engine 4 is used to update the weights 12 associated with each matching method 9. The voting engine 4 may apply a linear or non-linear function of the votes to determine the appropriate weight 12, so that as each source alert is processed the total score is weighted in favour of the most reliable matching methods, improving the accuracy of the matching process. This results in a continuous improvement in the accuracy of the matching methods 9. It is an advantage of the system 1 that the user is not required to be a technical expert skilled in the design of matching rules, but that the matching rules are updated by user action indirectly.

Referring again to FIG. 4, each match method 9 has an associated score 10, where the value of the score indicates the likelihood of a true match. A total score is determined by combining individual scores using a linear function such as linear polynomial expression of the individual scores or a non-linear function such as simply maximum of the individual scores. The feedback loop acts to vary the initial weights in accordance with measures of performance of each match method as received from the case management application.

The voting engine 4 weights each contributing matching score 10 with its individual weight 12. The weights are stored in the voting engine 4 and are themselves a function of the number of votes 1 associated with that matching method. The total score is then compared to a threshold. If the threshold is exceeded, the alert is linked to an existing event in the database 7. This is accomplished by updating the event record in the database 7 with the details of the linked source alert. If no link is found, the source alert is forwarded directly to the case management system 5. If one or more links are found, the new alert is forwarded to the case management system together with details of the links. Scoring functions and thresholds are stored in a database 7, and are used to parameterise run-time objects in memory when the voting engine 4 is instantiated.

The voting engine 4 maintains a register 11 of the performance of each of the classifier's matching methods 9. The register 11 is maintained in memory to maximise performance, and is periodically persisted to the database 7. In the example shown in FIG. 2, there are two voting categories for positive and negative user comment, however the number of voting categories is not restricted, but is preferably at least two. The voting engine 4 uses locking so that the registers 11 can not be simultaneously accessed by more than one user, thus preserving the integrity of the data in the register 11. In the example illustrated in FIG. 4, Match Method A outperforms the other two methods in terms of superior accuracy based on user feedback captured automatically during case management. Therefore, in future alert linking, this method will receive a relatively greater weighting.

Figure 5:
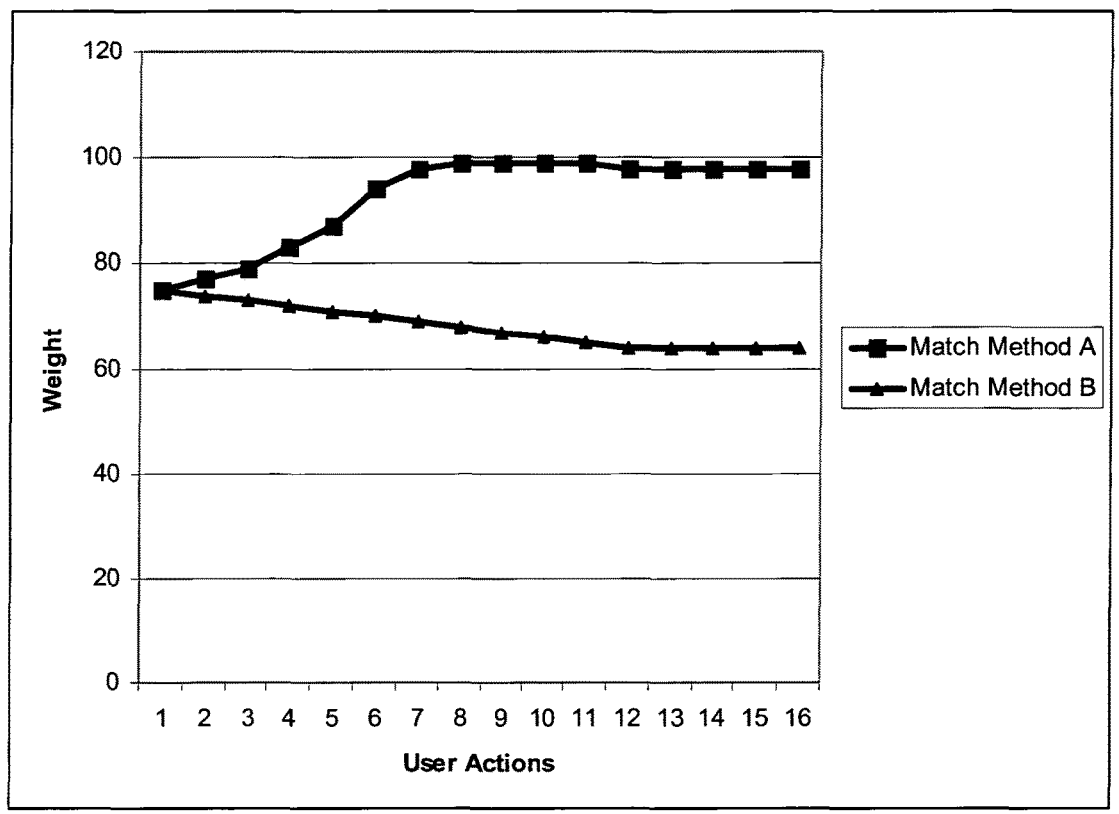
FIG. 5 is a schematic illustration of the output of the voting engine.

FIG. 5 shows the evolution of the weights 12 associated with each matching method in a sample of events that were monitored. Both methods initially have identical weights, but as the quality of linked incidents is continuously recorded by the voting engine 4 Match Method A proves to be superior, and has a relatively higher weighting.

It is an advantage of the invention that the system 1 can identify patterns which are not event-driven. Indeed the system 1 may identify patterns which involve absence of expected events.

Periodically, the timer (8) inspects the database (7) and extracts a set of grouped incidents according to user-defined search criteria, for example based on date. Each incident is processed sequentially through the classifier (3) and compared to all other members of the group using a set of match methods (9) which may be variations of the match methods used when each alert was processed in an event-driven mode. Should the classifier find links, the linked alert function inserts a new database record comprising the unique key of the group, the unique key(s) of the linked alerts or other incidents and a flag to indicate that the alerts are linked.

It will be appreciated that the invention provides for comprehensive monitoring of activity involving presence or absence of events. It can thus detect complex activities, such as complex fraud situations or engineering plant fault diagnosis.

The invention is not limited to the embodiments described but may be varied in construction and detail.

The invention claimed is:

1. A fraud linking system for identifying links between determined fraud events detected in external systems, each external system having at least one fraud detection engine, the fraud linking system comprising:
   an external interface configured to receive alerts reporting determined fraud events detected in the external systems by the respective at least one fraud detection engine;
   a storage device configured to store determined historical fraud events in a database including the received determined fraud events in the alerts;
   a processor comprising hardware configured to provide:
   an alert classifier arranged to implement a plurality of match methods for detecting links between a received alert from one of the external systems and one or more stored determined historical fraud events or another received alert from another one of the external systems, each match method implementing different matching criteria, the alert classifier thereby generating and outputting a respective score for each match method representative of the extent of matching with one or more identified determined historical fraud events or another received alert; and
   a voting engine for applying a set of weightings to the scores generated by the classifier for each of the match methods and for determining that there is a link with an identified determined historical fraud event or another received alert if a combination of the weighted scores exceeds a predetermined threshold.

2. The fraud linking system as claimed in claim 1, wherein the matching criteria of the plurality of matching methods comprise criteria defined in relation to specific field types in a received alert, selected from a numerical field, a name field and a risk quantifier.

3. The fraud linking system as claimed in claim 1, further comprising a case management sub-system arranged to receive notification of links determined by the voting engine and to receive feedback from a user regarding validity of a notified link, including an indication of whether the notified link comprises a false-positive or a false-negative linkage, and to forward the received feedback to the voting engine for use in adjusting the set of weightings.

4. The fraud linking system as claimed in claim 3, wherein the voting engine is arranged to adjust weightings in the set of weightings by applying linear or non-linear functions to feedback received from the case management sub-system to thereby favour scores generated in the alert classifier by match methods reliably indicative of valid links.

5. The fraud linking system as claimed in claim 4, wherein the voting engine is arranged to maintain a register of match method performance, using data stored in the register in the adjustment of weightings, and to update the register according to the received feedback, making use of register locking to ensure that updates due to feedback from more than one user may not be made simultaneously, thus preserving the integrity of the data stored in the register.

6. The fraud linking system as claimed in claim 3, further comprising a timer arranged periodically to trigger a process whereby a plurality of records of determined historical fraud events are extracted from the database according to predetermined search criteria and passed through the alert classifier and the voting engine to identify links between the extracted determined historical fraud events using the plurality of match methods or different match methods, any determined links being then recorded in the database using a unique key to identify the linked events as a group and notified to the case management sub-system.

7. The fraud linking system as claimed in claim 1, wherein the processor comprising hardware is further configured to provide an adapter for performing one or more functions upon receiving alerts, selected from:
   normalizing a received alert;
   alert validation;
   addition of data, retrieved dynamically from an external database, to a received alert;
   executing a set of logical routines on individual fields of a received alert to perform validation of fields of the alert to check that they satisfy quality tests;
   executing a set of logical routines to perform transformation of individual fields in a received alert into a required format or create additional fields which are combinations of existing fields; and
   routing a received alert directly to the alert classifier without modification.

8. The fraud linking system as claimed in claim 1, wherein the processor comprising hardware is further configured to provide an adapter for normalizing the alerts, and wherein:
   the adapter performs alert validation, and
   the adapter adds data to an alert, and
   the adapter dynamically retrieves data from an external database to add to an alert, wherein the processor comprising hardware is further configured to route alert directly to the classifier, by-passing the adapter when a condition is satisfied; and wherein the fraud linking system further comprises memory buffers to temporarily hold messages until they can be processed.

9. The fraud linking system as claimed in claim 1, wherein:
   the processor comprising hardware is further configured to provide an adapter for normalizing the alerts, and wherein the adapter performs alert validation, and
   the adapter adds data to an alert, and
   the adapter dynamically retrieves data from an external database to add to an alert, wherein the processor comprising hardware is further configured to route a alert directly to the alert classifier, by-passing the adapter when a condition is satisfied;
   wherein the fraud linking system further comprises memory buffers to temporarily hold messages until they can be processed; and
   wherein the processor comprising hardware is further configured to fetch messages from one of the memory buffers and to execute a set of logical routines on individual fields of each alert to perform validation of fields of the alert to check that they meet quality tests.

10. The fraud linking system as claimed in claim 1, wherein:
   the processor comprising hardware is further configured to notify a case management system of links, and wherein
   the voting engine comprises a function for receiving from the case management system feedback of success of each match method, and for adjusting match method weights accordingly,
   the voting engine is adapted to initialize a plurality of match method weights to be equal and to vary them according to success of each individual match method in identifying links, and
   said feedback includes a number of false positives and a number of false negatives; and wherein said routines perform transformation of individual alert fields into a required format or create additional fields which are combinations of existing fields.

11. The fraud linking system as claimed in claim 1, further comprising a configuration function for configuring at least one of the components of the fraud linking system, including the alert classifier.

12. The fraud linking system as claimed in claim 1, further comprising a case management system for transmitting feedback to the alert classifier, and wherein:
the processor comprising hardware is further configured to notify a case management system of links,
the voting engine comprises a function for receiving from the case management system feedback of success of each match method, and for adjusting match method weights accordingly,
the voting engine is adapted to initialize a plurality of match method weights to be equal and to vary them according to success of each individual match method in identifying links, and
said feedback includes a number of false positives and a number of false negatives.

13. A non-transitory computer readable medium comprising software code for performing the alert classifier and the voting engine of a fraud linking system of claim 1 when the processor comprising hardware is a digital processor.

14. The fraud linking system as claimed in claim 6, wherein the processor comprising hardware is further configured to insert into the database a new database record comprising the unique key of the alert, the unique key(s) of one or more alerts and a flag to indicate that the alerts are linked.

15. The fraud linking system as claimed in claim 7, wherein the alert adapter translates received alerts so that they contain four fields including a unique identifier, name, date of birth and average transaction size.

16. The fraud linking system as claimed in claim 1, wherein the match methods include fuzzy text matching to find possible common sources based on descriptive attributes selected from name, address, occupation; or quantitative attributes selected from Euclidean distance, Mahalanobis distance, transaction size, transaction frequency.

17. The fraud linking system as claimed in claim 1, wherein different received alerts indicate detected events associated with different persons.

18. The fraud linking system as claimed in claim 17, wherein the different received alerts indicate detected events associated with one of different persons and a same person, respectively.

* * * * *